United States Patent [19]

Gierhart et al.

[11] Patent Number: 5,186,964
[45] Date of Patent: Feb. 16, 1993

[54] FLAVOR COMPOSITION FOR PET FOOD

[75] Inventors: Dennis L. Gierhart, High Ridge; William C. Hogan, Bridgeton, both of Mo.

[73] Assignee: Applied Food Biotechnology, Inc., Fenton, Mo.

[21] Appl. No.: 577,114

[22] Filed: Sep. 4, 1990

[51] Int. Cl.⁵ ............................................. A23K 1/00
[52] U.S. Cl. ................................. 426/74; 426/302; 426/533; 426/805
[58] Field of Search ................ 426/302, 92, 534, 623, 426/630, 805, 807, 74, 533

[56] References Cited

U.S. PATENT DOCUMENTS

| | | | |
|---|---|---|---|
| 3,679,429 | 7/1972 | Mohrman | 426/805 |
| 3,930,031 | 12/1975 | Kealy | 426/805 |
| 4,127,678 | 11/1978 | Burkwall | 426/805 |
| 4,215,149 | 7/1980 | Majlinger | 426/805 |
| 4,444,796 | 4/1984 | Ueno et al. | 426/623 |
| 5,000,943 | 3/1991 | Scaglione et al. | 426/549 |
| 5,000,973 | 3/1991 | Scaglione et al. | 426/89 |
| 5,015,485 | 5/1991 | Scaglione et al. | 426/89 |
| 5,047,231 | 9/1991 | Spanier et al. | 426/635 |

OTHER PUBLICATIONS

Kirk-Othmer Encyclopedia of Chemical Technology 2nd edition vol. 15 pp. 232-276 (1969).
Hawley "The Condensed Chemical Dictionary" Van Nostrand Reinhold Co (1982) 10th Edition pp. 950-951.

Primary Examiner—R. B. Penland
Attorney, Agent, or Firm—Leydig, Voit & Mayer

[57] ABSTRACT

A palatability enhancer composition for pet food comprises a pyrophosphate salt or an acid phosphate salt. The palatability enhancer may also include at least one of the following: an organic acid, a flavor, and phosphoric acid.

3 Claims, No Drawings

FLAVOR COMPOSITION FOR PET FOOD

This invention generally relates to dry or liquid flavor compositions or coatings for dry pet foods. The flavor compositions provide maximum palatability at low application levels.

BACKGROUND OF THE INVENTION

The makers of animal food, particularly cat food, have a long-standing desire to provide a pet food having a high degree of nutritional value, palatability, resistance to bacterial contamination and/or decomposition, but with concomitant low production costs and low application levels of coatings or additives. Each of these attributes, in various degrees, may be found in the three categories of pet food: (1) canned or high moisture content products (greater than 50% moisture), which are typically all meat products, and, for this reason, are generally more palatable to the animal. However, these products are not as nutritious per unit weight, require preservation to reduce or inhibit bacterial decomposition, and require more costly production and packaging; (2) dry or low moisture content products (less than 15% moisture) have the highest nutritional content, least expensive packaging, greatest convenience, but are least palatable; and (3) semi-dry or intermediate moisture content products (about 15% to 50% moisture), which generally have a nutritional value higher than canned food and are easier to package and more convenient to use, but may also support the growth of contaminating microorganisms. Semi-dry products are generally less palatable than canned food, but generally more palatable than dry food.

Dry and semi-dry products are generally preferred because they are more nutritional, easier to package, more convenient to use, and less costly to produce. However, many animals, particularly cats, are picky eaters which require a high degree of palatability. There is a continuing need, therefore, to produce more palatable food which has a low moisture content.

Phosphoric acid, coated onto the surface of a dry cat food, has been shown to be a palatability enhancer. U.S. Pat. No. 3,679,429 discloses a method for improving palatability of dry cat food by coating pellets of the food with fat and one of the following flavor enhancing acids: 0.05% to 0.3% hexamic, 0.35% to 1.0% phosphoric, or 0.5% to 1.0% citric. U.S. Pat. No. 3,930,031 discloses improving the palatability of semi-dry and dry cat food by coating the food with a synergistic mixture of phosphoric acid and citric acid wherein the coating provides at least 0.5% by weight phosphoric acid. However, the application of an acid is known to accelerate the oxidation of fats, which, as noted above, are typically applied topically to dry cat foods. This problem may be overcome as shown in U.S. Pat. No. 4,215,149, which discloses a method for maintaining the palatability of stored dry pet food by coating the food with a salt of phosphoric acid, particularly monosodium phosphate or sodium acid phosphate, in the range of 0.25% to 2.0% by weight.

Palatability of dry pet food may also be enhanced by the application of flavors. However, liquid flavors are normally applied separately from phosphoric acid, because liquid phosphoric acid is corrosive and difficult and hazardous to handle. Thus, the use of phosphoric acid and flavors as liquid palatability enhancers generally requires separate holding tanks and application systems. Furthermore, a liquid flavor formula containing greater than about 5% phosphoric acid is highly destructive to the flavor components, thus dramatically decreasing the effectiveness of a liquid flavor when present at levels where the acid could effect cat food palatability.

Some flavors are sold in a composition containing optimal levels of phosphoric acid and digest, but these enhancers must then be applied at levels greater than 4%. Simple calculations show that unless a liquid is >20% phosphoric acid, it is not possible to simultaneously apply optimal levels of phosphoric acid unless significant levels of liquid digest are applied (>2-3% of liquid digest). This in turn requires the simultaneous addition of significant amounts of water to the dry product, causing potential microbial instability.

More importantly, liquid phosphoric acid cannot be added to dry flavors, therefore, palatability enhancers which combine these two ingredients are not commercially available. Unfortunately, dry phosphoric acid is relatively unobtainable, uneconomical, and difficult to handle. However, U.S. Pat. No. 4,215,149 discloses that the dry application of sodium acid phosphate (SAP) is equal or superior to phosphoric acid, but it does not show a composition that combines a dry flavor with the phosphate.

SUMMARY OF THE INVENTION

Compositions according to the present invention comprise dry pet food flavor or coating compositions that provide maximum palatability at low application levels. Dry flavor or coating compositions in accordance with the invention exhibit excellent flow properties, while providing both flavor and an acidic taste in a single composition. The dry combination of a flavor with an acid buffer or an acid buffer/organic acid combination exhibits significant production and application benefits. Additionally, the present invention comprises a dry combination that significantly beats a dry flavor applied separately from phosphoric acid. Liquid flavor or coating compositions in accordance with the invention can do the same as above, and also minimize water addition, contributing to improved microbial stability and lower energy costs for drying.

DESCRIPTION OF THE PREFERRED EMBODIMENTS

The present invention involves liquid and dry palatability enhancer compositions for dry pet foods. In accordance with the invention, these palatability enhancers may be used with or without flavors. The flavor compositions according to the invention include at least one flavor combined with at least one acid buffer; the flavor compositions may also optionally include at least one organic acid.

Palatability enhancers according to the invention are a coating or layer applied onto the surface of a basal food composition. These enhancers are not intended to be mixed into the basal food, nor are they acidulents, i.e., they are not applied in amounts enough to acidify the basal food.

Flavor, as used herein, typically refers to meat and cheese flavorings, and includes digests. Flavors comprise about 0.1 to about 99% of the palatability enhancer.

Acid buffer, as used herein, refers to salts of mineral acids. Typical examples of these mineral acids include phosphoric, sulfuric, and hydrochloric. Typically, these salts include calcium, sodium, and potassium. A preferred salt is sodium acid phosphate (SAP), and typically comprises about 0.1% to about 99% of the flavor composition. More preferred are polyphosphoric acid salts, including but not limited to sodium acid pyrophosphate (SAPP). SAPP typically comprises about 0.1% to about 99% of the flavor composition. Pyrophosphate gives equivalent palatability at lower application levels and at a higher surface pH than phosphoric acid. This may be a nutritional benefit. Furthermore, SAP and SAPP both work in a liquid and dry form, yet the pH effect is much less pronounced than that obtained by phosphoric acid.

Organic acid, as used herein, refers to at least one of the group selected from citric, tartaric, fumaric, lactic, acetic, formic, and hexamic acids. The preferred organic acid is citric acid, and typically comprises about 0.05% to about 98% of the flavor composition and 0.01% to about 2.5% of the food composition.

Basal composition, as used herein, refers to the dry pet food to which the palatability enhancer or flavor composition is added. The basal composition typically includes at least one of the following: poultry or beef by-products; vegetable protein meals; animal proteins; animal tissue or meals; grains, such as corn, milo, alfalfa, wheat, soy, and the like; carbohydrates; fat, e.g., tallow; minerals; vitamins; and preservatives. It is intended that the invention is not to be limited to any specific recitation of food ingredients, or to any additives other than the palatability enhancer compositions according to the invention. Preferred basal compositions are those that are commercially sold, and are nutritionally balanced. The pet food is typically in bite size or pellet form of any shape.

Coating, as used herein, refers to the topical deposition of the palatability enhancer or flavor composition onto the surface of the basal composition, such as by spraying, dusting, and the like. The flavor composition of the present invention may be coated onto the basal composition before, after, or as part of a fat coating, if applied. It is preferred, although not required, that the flavor composition of the present invention is coated onto the basal composition uniformly or that uniform distribution of the flavor composition is achieved, i.e., by repeatedly tumbling the coated pet food. One or more coats may be applied. A particular sequence of coats is not critical to the practice of the invention.

An embodiment of the invention includes the use of liquid or dry SAPP as a coating for dry pet food without the inclusion of a flavor. According to this embodiment of the invention, SAPP comprises about 0.05% to about 2.0% by weight of the pet food. As shown in the examples, the application of low levels of dry SAPP (as little as 0.25% by weight of the pet food) is superior or equivalent to much higher application levels of phosphoric acid. Liquid SAPP is greatly superior to phosphoric acid.

Another embodiment of the invention includes the use of dry or liquid SAPP as a coating for dry pet food in combination with a flavor. As shown in the examples, the application of SAPP and a flavor is superior to an equivalent amount of phosphoric acid and a flavor.

Another embodiment of the invention includes the use of liquid or dry SAPP as a coating for pet food, with or without the inclusion of a flavor, but in combination with an organic acid. According to this embodiment of the invention, SAPP comprises about 0.05% to about 2.0% by weight of the pet food, and the organic acid comprises about 0.01% to about 2.0% by weight of the pet food. The Examples show that a combination of liquid or dry SAPP, with or without flavor, is superior to phosphoric acid and flavor, or phosphoric acid alone.

Another embodiment of the invention includes the use of dry or liquid SAPP as a coating for dry pet food in order to supplement phosphoric acid. The examples show that SAPP enhances the palatability of pet food coated with phosphoric acid.

Another embodiment of the invention includes the use of dry or liquid SAP as a coating for dry pet food in combination with a dry or liquid flavor. As shown in the examples, the application of SAP and a flavor is superior to a flavor alone.

Method for Coating Cat Food

Kibbles, for example, uncoated extruded basal cat food obtained from a pet food manufacturer, are typically placed in a convenient container for mixing, such as a small cement mixer, tub or coating drum. A fat, such as lard, critical animal fat or beef tallow, is heated to about 160° F. and sprayed onto the cat food in any convenient manner to obtain a coating of the kibbles. The coating need not be a continuous layer yet any reasonable sample preferably exhibits a uniformity of coating. The cat food should be mixed during and for a few minutes after spraying the fat to improve uniformity of the coating, although a uniform coating is not required. After the fat is applied, it cools quickly and acts as an imperfect barrier to other compounds that are applied following fat coating. At this point a flavor may be applied as either a dry powder or a liquid. A liquid flavor is typically sprayed on while the product is mixing. A dry flavor is typically dusted on, preferably through a mesh screen to make the application more uniform on the kibbles, while the product is mixing. Alternatively, a flavor could be mixed with the fat and applied concurrently.

In order that the invention herein described may be more fully understood, the following examples are for illustrative purposes only and are not to be construed as limiting this invention in any manner.

EXAMPLES

The test data tabulated in the examples is derived from the industry standard two bowl comparison. Each animal is presented with two bowls of food, each containing a measured amount of one of the test rations. The amount of food eaten is measured. A direct comparison of two rations gives a reliable indication of relative palatability.

For these tests, five cats were fed for four days to give a total of twenty choices. An independent cattery was used. The bowl position was changed daily to eliminate animals that show a preference for right or left placement of the bowls. The cumulative amounts of the two rations were used to calculate the consumption ratio (C.R.). The ration with more eaten was divided by the ration with less eaten to give a positive ratio. For example, a C.R. of 2 means that twice as much of one ration was eaten as compared to the other ration.

EXAMPLE 1.

Various liquid and dry cat food compositions according to the invention were compared with a variety of conventional cat food compositions in order to determine their relative palatability. Tests A–D compare compositions according to the invention containing sodium pyrophosphate to phosphoric acid; Test E compares a SAPP composition to SAP; Test F tests the addition of SAPP to a conventional palatability enhancer; Test G tests the addition of a SAPP composition to a conventional flavor. In Tests A-E, liquid phosphoric acid was used in an amount which is typically used commercially.

TABLE 1

| Test | Descriptions | C.R. |
|---|---|---|
| A | .9% Phosphoric Acid vs. 2% of 50% solution of Sodium Pyrophosphate (liquid) | 9.04 |
| B | .9% Phosphoric Acid vs. .5% Sodium Pyrophosphate (dry) | 1.09 |
| C | .9% Phosphoric Acid vs. .25% Sodium Pyrophosphate (dry) | 1.28 |
| D | .9% Phosphoric Acid vs. .15% Sodium Pyrophosphate and .05% Citric (dry) | 1.13 |
| E | .2% Sodium Pyrophosphate and .05% Citric (dry) vs. .75% Sodium Acid Phosphate (dry) | 1.84 |
| F | .9% Phosphoric Acid and .75% Whey (dry) vs. .9% Phosphoric Acid, .75% Whey and .25% Sodium Pyrophosphate (dry) | 1.98 |
| G | .25% Sodium Pyrophosphate and .05% Citric (dry) vs. .25% Sodium Pyrophosphate, .05% Citric and .7% Flavor (dry) | 3.35 |

Results: Test A shows that liquid SAPP is strongly preferred over liquid phosphoric acid. Tests B-C show that low levels of dry SAPP are equal to or better than liquid phosphoric acid. Test D shows that very low levels of dry SAPP and an organic acid are equal to or better than liquid phosphoric acid. Test E shows that dry SAPP and an organic acid are equal to or better than dry SAP. Test F shows that a typical phosphoric acid palatability enhancer composition is improved by the addition of dry SAPP. Test G shows that a dry SAPP and organic acid composition is improved by the addition of a flavor.

EXAMPLE 2.

Palatability tests were performed as noted above in order to test the use of dry flavors (Tests A-D and H-I) as compared to liquid flavors (Tests E-G), and various compositions according to the invention to phosphoric acid. Liquid compositions are liquid when applied and dry compositions are dry when applied.

TABLE II**

| Comparison | Citric 0.1% | SAP 0.5% | SAPP 0.5% | Phos* 0.5% | Dry Flavor 1% | Liq. Flavor 1% | C.R. |
|---|---|---|---|---|---|---|---|
| A | Citric | | SAPP | | Dry Flavor | | 1.9 |
|   |        | | SAPP | | Dry Flavor | |     |
| B |        | SAP | | | Dry Flavor | | 6.2 |
|   |        |     | | | Dry Flavor | |     |
| C |        |     | SAPP | | Dry Flavor | | 5.4 |
|   |        |     |      | Phos | Dry Flavor | |     |
| D | Citric |     | SAPP | | Dry Flavor | | 2.1 |
|   |        |     |      | Phos | Dry Flavor | |     |
| E |        | SAP |      |      |            | Liq. Flavor | 8.5 |
|   |        |     |      |      |            | Liq. Flavor |     |
| F |        |     | SAPP |      |            | Liq. Flavor | 11.4 |
|   |        |     |      |      |            | Liq. Flavor |     |
| G | Citric |     | SAPP |      |            | Liq. Flavor | 8.4 |
|   |        |     |      | Phos |            | Liq. Flavor |     |
| H |        | SAP .33% |  |      | Dry Flavor .66% | |     |
|   | Citric .06% |  | SAPP .33% | | Dry Flavor .6% | | 3.1 |
| I |        |     |      | Phos .9% | Dry Flavor .5% | |     |
|   | Citric .05% |  | SAPP .25% | | Dry Flavor .5% | | 2.2 |
| J |        | SAP (Liq) | | |            | | 7.3 |

*Phosphoric acid was added separately.
**Levels of additives are shown in the column headings, except as noted.

Results: Comparison A shows that a dry SAPP and flavor composition is improved by the addition of an organic acid. Comparison B shows a dry flavor is improved by the addition of SAP. Comparison C shows that SAPP is better than phosphoric acid when combined with a dry flavor. Comparison D shows SAPP and an organic acid is better than phosphoric acid when combined with a dry flavor. Comparison E shows that a liquid slurry of SAP and flavor is effective. Comparison F shows that a liquid slurry of SAPP and flavor is effective. Comparison G shows that a liquid SAPP and organic acid composition is strongly preferred over phosphoric acid, when both are combined with a liquid flavor. Comparison H shows SAPP to be more effective than SAP. Comparison I shows that lower levels of SAPP in a dry composition including an organic acid and flavor works very effectively vs. 0.9% phosphoric acid and a flavor. Comparison J shows SAP by itself as a liquid slurry is effective.

While the invention has been described in some detail by way of illustration and example, it should be understood that the invention is susceptible to various modifications and alternative forms, and is not restricted to the specific embodiments set forth in the Examples. It should be understood that these Examples are not intended to limit the invention but, on the contrary, the intention is to cover all modifications, equivalents, and alternatives falling within the spirit and scope of the invention.

What is claimed is:

1. A method of increasing the palatability of an extruded dry cat food composition comprising topically applying to said cat food a palatability enchancer composition consisting essentially of from about 0.1 to about 99%, by weight, of sodium acid pyrophosphate, in sufficient quantity to deposit from about 0.05 to about 2.0% of said sodium acid pyrophosphate, by weight of the food composition.

2. The method of claim 1 wherein the sodium acid pyrophosphate is concurrently applied with an organic acid in sufficient quantity to deposit from about 0.01 to 2.5% of said organic acid, by weight of the food composition.

3. The method of claim 2 wherein a falvorant is also concurrently deposited with said sodium acid pyrophosphate and said organic acid.

* * * * *